W. A. Fenn.
Animal Trap.

Nº 89,300. Patented Apr. 27, 1869.

Witnesses:
S. W. Adnew
Geo. W. Miatt

Inventor:
Wm. A. Fenn
By J. Fraser & Co.
Attys.

WILLIAM A. FENN, OF ROCHESTER, NEW YORK, ASSIGNOR TO HIMSELF AND HENRY B. BEACH, OF MERIDEN, CONNECTICUT.

Letters Patent No. 89,300, dated April 27, 1869.

IMPROVED ANIMAL-TRAP.

The Schedule referred to in these Letters Patent and making part of the same.

*To all whom it may concern:*

Be it known that I, WILLIAM A. FENN, of the city of Rochester, county of Monroe, and State of New York, have invented a certain new and useful Improvement in Animal-Traps; and I do hereby declare that the following is a full and exact description thereof, reference being had to the accompanying drawings, making part of this specification, in which—

Figure 1:
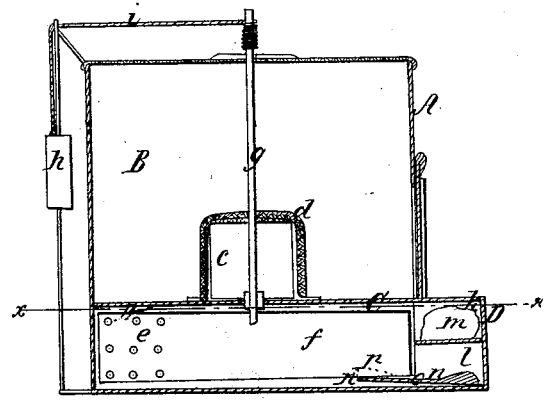

Figure 1 is a central vertical section of my improved trap.

Figure 2:
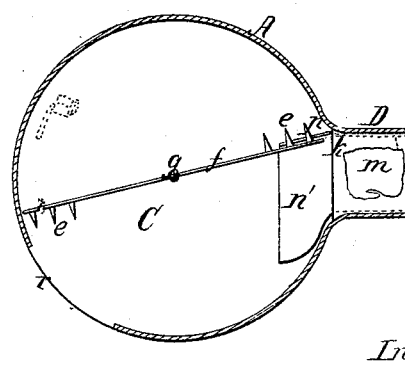

Figure 2, a horizontal section in line $x\,x$.

Figure 3:
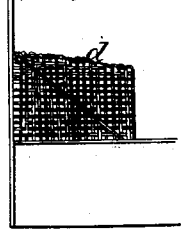

Figure 3, a section through the trap-door.

Like letters of reference indicate corresponding parts in all the figures.

My invention consists in the special construction and arrangement hereinafter described, whereby the trap may be made of sheet-metal, in compact form, and the working-parts be made more effective than heretofore.

In the drawings—

A represents a circular case, or box, made of sheet-metal, by bending a strip of suitable width, and uniting the edges by a seam, or otherwise. The case is divided by a horizontal partition, $a$, into two chambers, B C, connected only by an opening, $b$, covered by a trap-door, $c$, made of mica or glass, and shielded by cage $d$.

In the lower chamber is fitted a turning gate, $f$, preferably armed with points $e\,e$, extending across the chamber, and attached to a spindle, $g$, which passes up through the case, and has connected with its top either a weight, $h$, by means of cord $i$, or else a spring, of suitable form, which, when wound up, imparts turning motion to the spindle.

From the lower chamber is made an offset, D, having two cavities, $k\,l$, in the upper of which rests the bait $m$, while in the lower is pivoted a horizontal platform, or trigger $n$.

The rear or back end of this platform is made to overbalance the projecting end $n'$, which latter is of considerable extent to serve as the foothold for the animal as he reaches after the bait.

One edge of the platform is bent up at right angles to form a catch, $p$, for holding the gate from turning when the trap is set.

The action is as follows:

The animal enters through open door $r$, and, stepping upon platform $n'$ to reach the bait, he depresses it, so as to release the gate from catch $p$, when it turns around behind him and drives him around, impelled by points $e$, till the opposite end of the gate strikes the catch, which by this time has resumed its place. Finding no other means of egress, he passes up through trap-door $c$, which closes behind him and secures him in chamber B. The trap meanwhile is set and in readiness for another animal.

I am aware that the principle involved in my invention is old. In other devices, the animal stepping upon a platform springs a gate or slide that closes in after him, and he then escapes into another chamber, while the trap resets itself. I do not claim this principle. But in such arrangements heretofore known, the construction is expensive, and the trap occupies much space, being made of wood generally, in oblong form. My object is to combine the necessary parts in the least possible compass, and to make the trap entirely of sheet-metal.

To do this, I make the case of circular form, and locate the chambers B C, one directly over the other, the upper serving simply as the receptacle, while the lower contains the working-parts. This special arrangement I believe to be new.

Besides the above, the arrangement of the working-parts is necessarily new, to fit the circular form of the case. The gate is hung centrally, and the cavities $k\,l$ project outside the circle, to allow the proper working of the parts.

What I claim as my invention, and desire to secure by Letters Patent is—

The combination, in the circular case A, of the centrally pivoted gate $f$, operated by a weight or spring, and the hinged platform $n'$, said parts being arranged in such a manner that the gate itself divides the circle of the lower chamber into two compartments, the positions of which change with the rotation of the gate, to admit and discharge the animal, as herein set forth.

Also, the offset D, containing the cavities $k\,l$, for the reception of the bait and the platform, as herein described.

Also, the combination, with the two chambers B C, situated directly one above the other, the transparent mica, or glass door $c$, arranged substantially as and for the purpose herein set forth.

In witness whereof, I have hereunto signed my name in the presence of two subscribing witnesses.

WM. A. FENN.

Witnesses:
R. F. OSGOOD,
GEO. W. MIATT.